(12) United States Patent
Mori et al.

(10) Patent No.: US 8,257,588 B2
(45) Date of Patent: Sep. 4, 2012

(54) OIL-WATER SEPARATOR WITH SELF-PRIMING PUMP

(75) Inventors: Yoji Mori, Tokyo (JP); Yasuichi Haga, Tokyo (JP); Yuji Ikehara, Tokyo (JP)

(73) Assignee: World Chemical Co., Ltd., Tokyo (JP)

( * ) Notice: Subject to any disclaimer, the term of this patent is extended or adjusted under 35 U.S.C. 154(b) by 40 days.

(21) Appl. No.: 12/929,658

(22) Filed: Feb. 7, 2011

(65) Prior Publication Data

US 2011/0226692 A1    Sep. 22, 2011

(30) Foreign Application Priority Data

Mar. 18, 2010 (JP) .................... P2010-61924

(51) Int. Cl.
 *B01D 17/038* (2006.01)

(52) U.S. Cl. .............. 210/257.1; 210/258; 210/259; 210/304; 210/416.1; 210/512.1

(58) Field of Classification Search .............. 210/257.1, 210/258, 259, 304, 416.1, 512.1
See application file for complete search history.

(56) References Cited

U.S. PATENT DOCUMENTS

| 5,080,792 A | 1/1992 | McGovern et al. |
| 6,872,239 B2 | 3/2005 | Nilsen et al. |

FOREIGN PATENT DOCUMENTS

| JP | 61-4705 | 1/1986 |
| JP | 8-252404 | 10/1996 |
| JP | 2001-104705 | 4/2001 |
| JP | 2001-321605 | 11/2001 |
| JP | 2002-538950 | 11/2002 |
| JP | 2003-225660 | 8/2003 |
| JP | 3597900 | 9/2004 |
| JP | 2008-264745 | 11/2008 |

*Primary Examiner* — David A Reifsnyder
(74) *Attorney, Agent, or Firm* — Roylance, Abrams, Berdo & Goodman L.L.P.

(57) ABSTRACT

An oil-water separator with a self-priming pump of high oil-water separation ability enables a mixed liquid to be introduced into the oil-water separator without causing emulsification. A separator portion separating a mixed liquid includes a rough cyclone separation portion. A main separation portion downstream of the rough separation portion performs main separation according to specific gravity. A water discharge portion connected to the main separation portion discharges water. An oil storage tank stores the oil separated from the water and overflowing the main separation portion. A self-priming liquid pump connected downstream of the separator portion and connected to the water discharge portion sucks the mixed liquid from an exterior to enable venting and discharging of air.

7 Claims, 7 Drawing Sheets

OIL-WATER SEPARATOR WITH SELF-PRIMING PUMP

BACKGROUND OF THE INVENTION

1. Field of the Invention

The present invention relates to an oil-water separator with self-priming pump and specifically relates to an oil-water separator for recovered oil resulting from recovery of scum in a sewage treatment plant, food factory, etc., coolant oil of a machining center, floating oil in a degreasing process in plating, etc.

2. Description of the Prior Arts

Conventionally, oil, for example, in industrial wastewater is ordinarily input in a diversely mixed state, and actual conditions of wastewater having oil and foreign matter mixed therein are totally non-uniform, being dependent on details of work performed from day to day, season, air temperature, water temperature, miscellaneous matter mixed in wastewater, etc.

However, there are problems in treating such wastewater in a terminal treatment plant in that costs of consumption power, etc., and large-scale equipment are required and, at the same time, environmental impact must be considered because large quantities of chemicals are used, etc.

Thus to resolve the conventional issues, the present inventor prior proposed an oil-water separator in which water and oil are first subject to rough separation by a cyclone portion, the water and the oil are thereafter subject to main separation by a specific gravity difference separation tank, and the water and the oil that could not be separated by the main separation are separated in a lower separation tank having a brush disposed in a spiral form to easily and rapidly perform separation of a mixed liquid with water and oil mixed therein by a simple and compact equipment that does not use any chemicals whatsoever and without worry of environmental pollution. Refer to Patent Document 1 (Japanese Published Unexamined Patent Application No. 2001-104705) and Patent Document 2 (Japanese Published Unexamined Patent Application No. 2001-321605).

SUMMARY OF THE INVENTION

As a result of continuing further research on the priorly proposed art, the present inventor discovered that in introducing the mixed liquid of water and oil into the oil-water separator by a pump or other liquid feeding unit, the water and the oil tend to emulsify readily in the pump and significant lowering of oil-water separation ability occurs when the emulsified mixed liquid is introduced into the oil-water separator.

Thus an object of the present invention is to provide an oil-water separator with self-priming pump that is high in oil-water separation ability and enables a mixed liquid to be introduced into the oil-water separator without causing emulsification of water and oil in the mixed liquid.

The object of the present invention is achieved by the following arrangements.

1. An oil-water separator with self-priming pump including a separator portion separating a mixed liquid in which oil is mixed in water, and a pump device portion introducing the mixed liquid into the separator portion, the oil-water separator with self-priming pump having an arrangement where the separator portion includes a rough separation portion performing rough separation of the oil and the water by cyclone separation in which a swirl flow is generated by introduction of the mixed liquid into a cyclone cylinder, a main separation portion connected to a downstream side of the rough separation portion and performing main separation of the oil and the water according to specific gravity difference by passing the mixed liquid, which has undergone the rough separation in the rough separation portion, from above to below through a liquid passage formed in multiple-step form, a water discharge portion connected to a lower portion of the multiple-step liquid passage of the main separation portion and discharging the water from which oil has been separated and removed at the main separation portion through a water discharge passage extending from the lower portion of the multiple-step liquid passage to an upper portion of the separator portion, and an oil storage tank storing the oil separated from the water at the main separation portion and overflowing from an upper portion of the main separation portion, the pump device portion includes a self-priming liquid pump connected to a downstream side of the separator portion and connected directly or indirectly to the water discharge portion to introduce the mixed liquid into the separator portion by sucking the mixed liquid from an exterior of the separator portion via the rough separation portion, the main separation portion, and the water discharge portion, and by an upper portion of the rough separation portion and a portion above, the main separation portion being communicatively connected by a communicating pipe, having one end connected to a portion of the rough separation portion positioned above the cyclone cylinder and having another end connected to a main body of the separator at a position above an overflow portion, which is an uppermost end portion of the main separation portion, and an upper portion of the main body of the separator, which is a portion above the overflow portion, and a portion above a liquid level of the water discharge portion and adjacent the portion above the overflow portion being communicatively connected by a communicating hole, a portion above a liquid level of the rough separation portion, a portion above the overflow portion that is a liquid level position of the main separation portion, and a portion above the liquid level of the water discharge portion are put in communication in a manner enabling air to be vented in that order and air, which has entered inside the separator, is thereby sucked and discharged by the self-priming pump.

2. The oil-water separator with self-priming pump according to 1 above where the oil separated from the water at the main separation portion and overflowing from the upper portion of the main separation portion is introduced into the oil storage tank via an oil passage pipe connected to the oil storage tank.

3. The oil-water separator with self-priming pump according to 2 above where the oil storage tank is detachably connected to the oil passage pipe, and an opening/closing valve for enabling a negative pressure state to be maintained inside the separator portion during attachment and detachment of an oil passage pipe is disposed in the oil passage pipe.

4. The oil-water separator with self-priming pump according to any of 1 to 3 above where the multiple-step liquid passage is formed by disposing conical, umbrella-shaped members in multiple steps, a liquid passing hole connecting the respective steps in a manner enabling passage of liquid is formed in a portion of a slope of each umbrella-shaped member, and a floating separation passage pipe, which lets the oil that separated from the water at a lower side of each umbrella-shaped member float to an upper side of the main separation portion, is connected to an apex portion of each umbrella-shaped member.

5. The oil-water separator with self-priming pump according to 4 above where a baffle plate, which resists flow of passing liquid, is disposed at an upper portion, at a downstream side in a liquid passing direction of the liquid passing hole, of each umbrella-shaped member.

6. The oil-water separator with self-priming pump according to any of 1 to 5 above where diameters of venting holes putting in communication the upper portion of the rough separation portion, the portion above the main separation portion, and the upper portion of the water discharge portion in the manner enabling venting of air are 1 to 10 mm.

7. The oil-water separator with self-priming pump according to any of 1 to 5 above where diameters of venting holes putting in communication the upper portion of the rough separation portion, the portion above the main separation portion, and the upper portion of the water discharge portion in the manner enabling venting of air are 4 to 5 mm.

DETAILED DESCRIPTION OF PREFERRED EMBODIMENT(S)

The present invention shall now be described in detail in accordance with the attached drawings.

Figure 1:
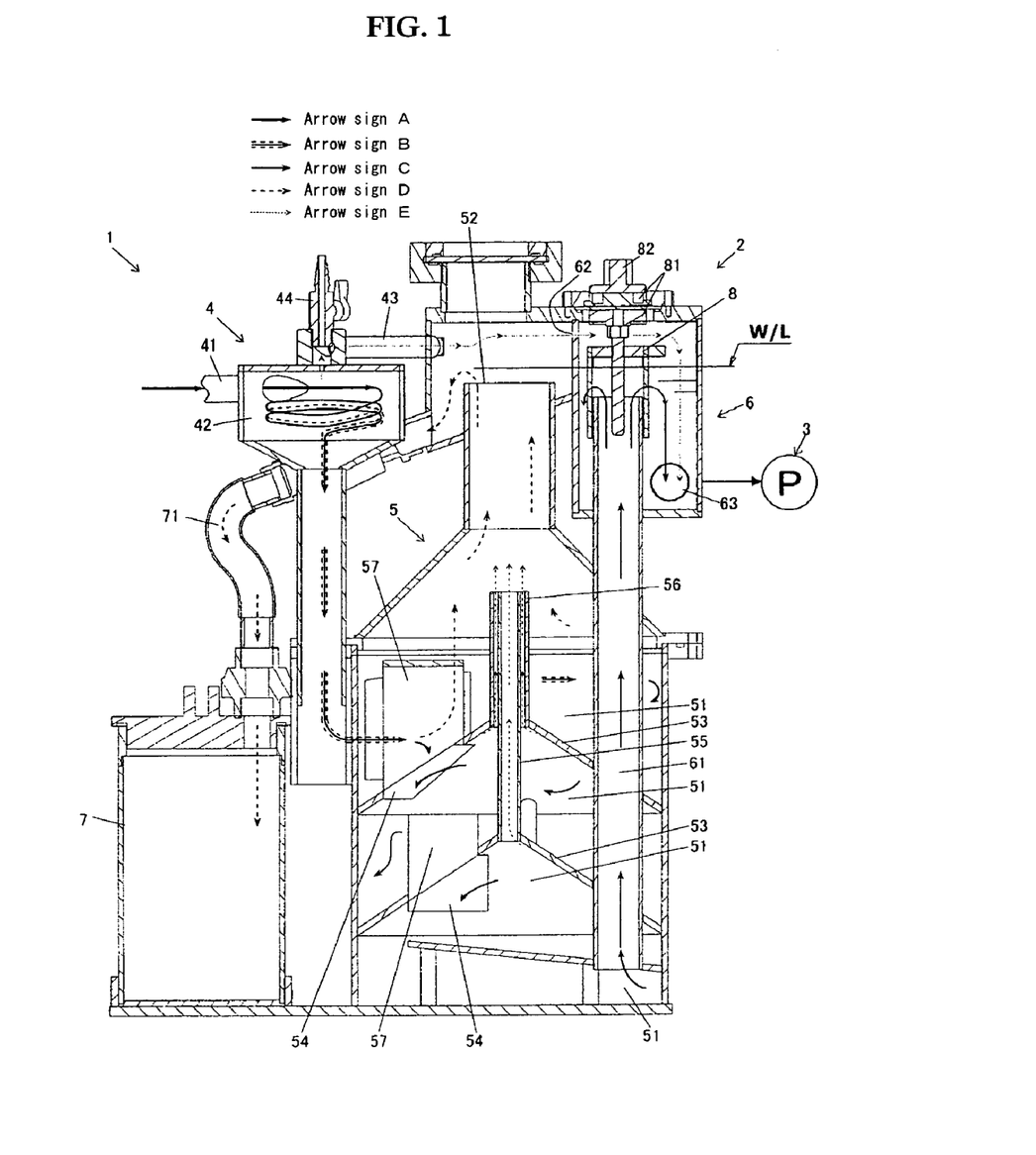
FIG. 1 is an explanatory diagram showing an internal structure of an embodiment of the present invention in a sectioned state.
Figure 2:
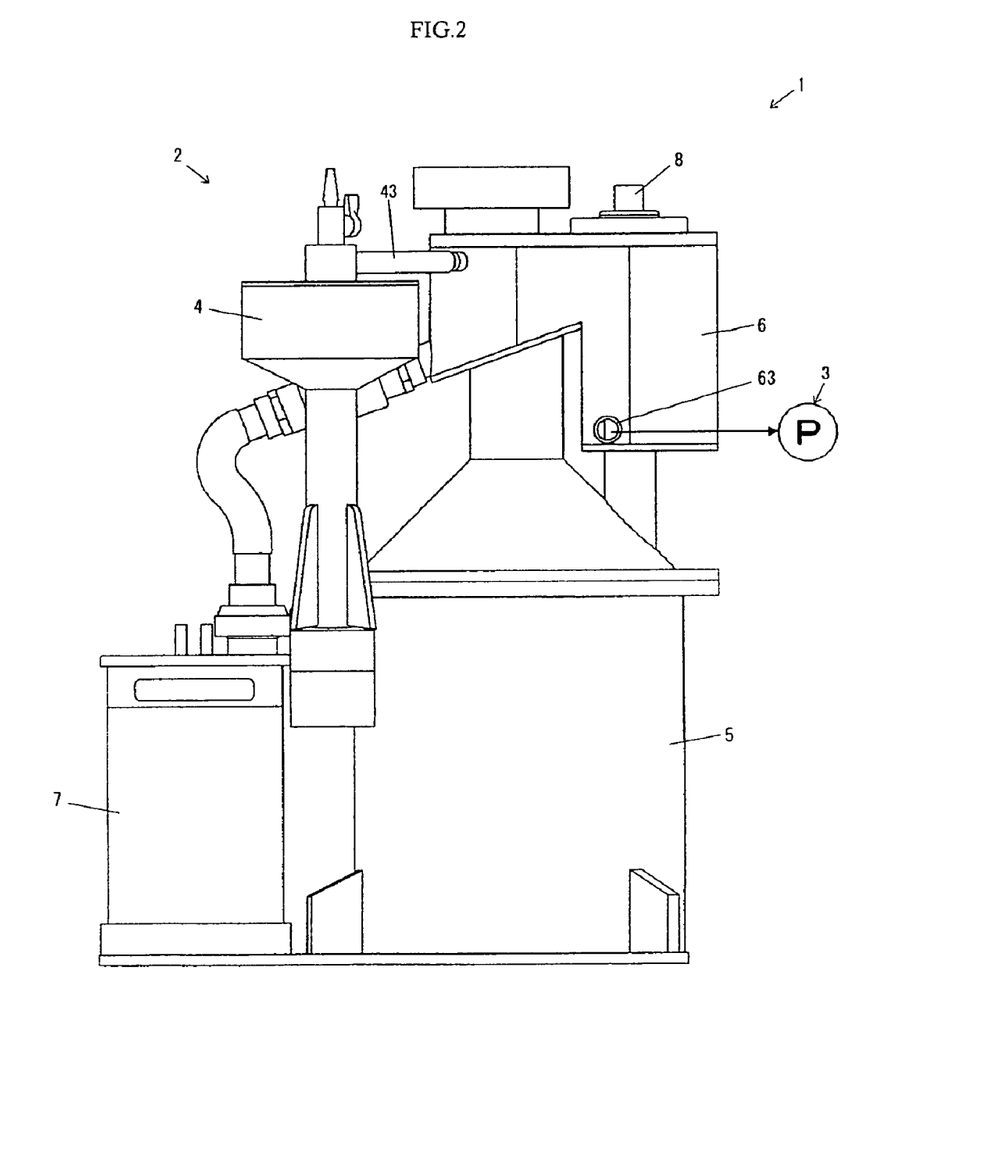
FIG. 2 is a front view of the embodiment of the present invention.
Figure 3:
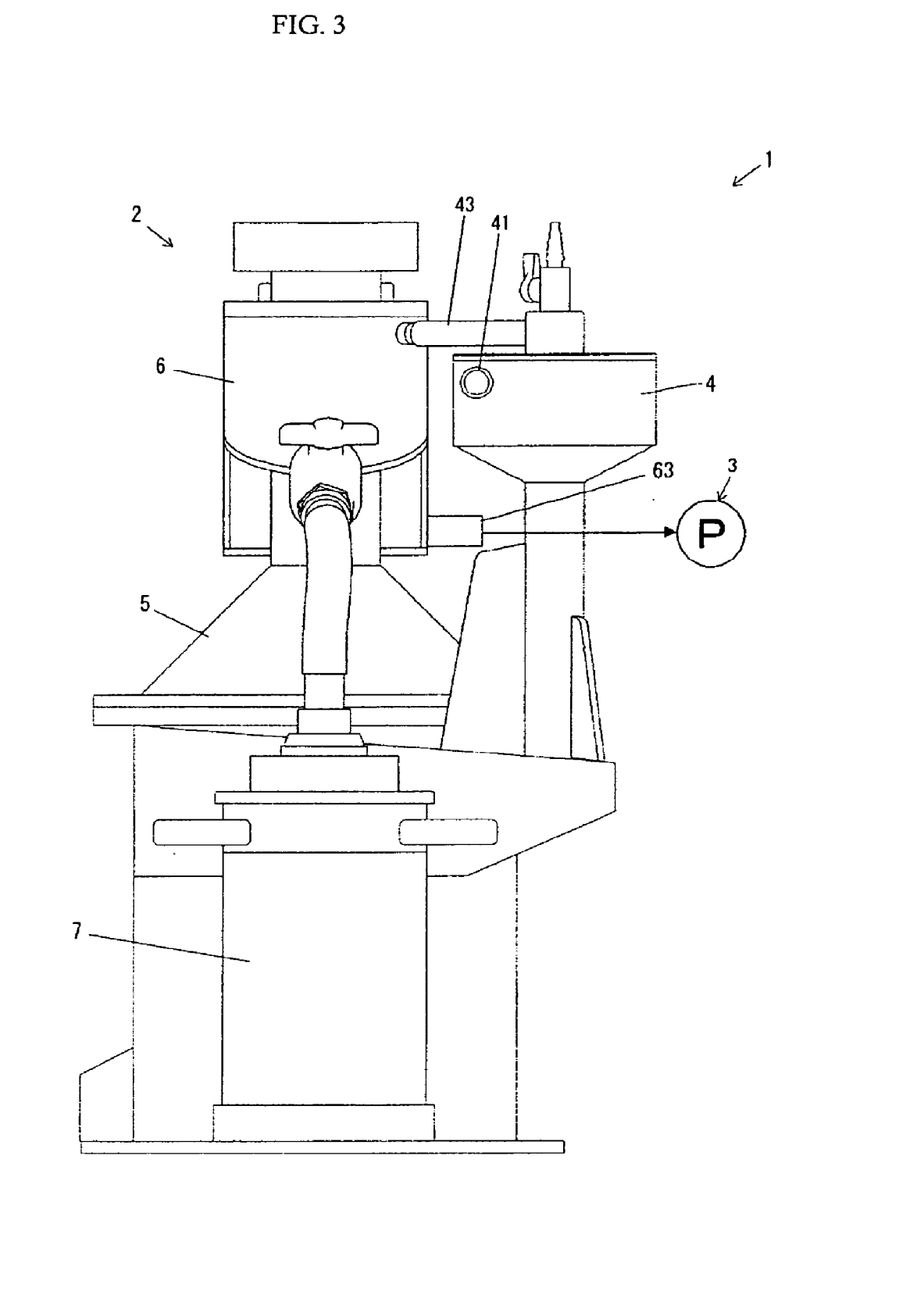
FIG. 3 is a left side view of the same.
Figure 4:
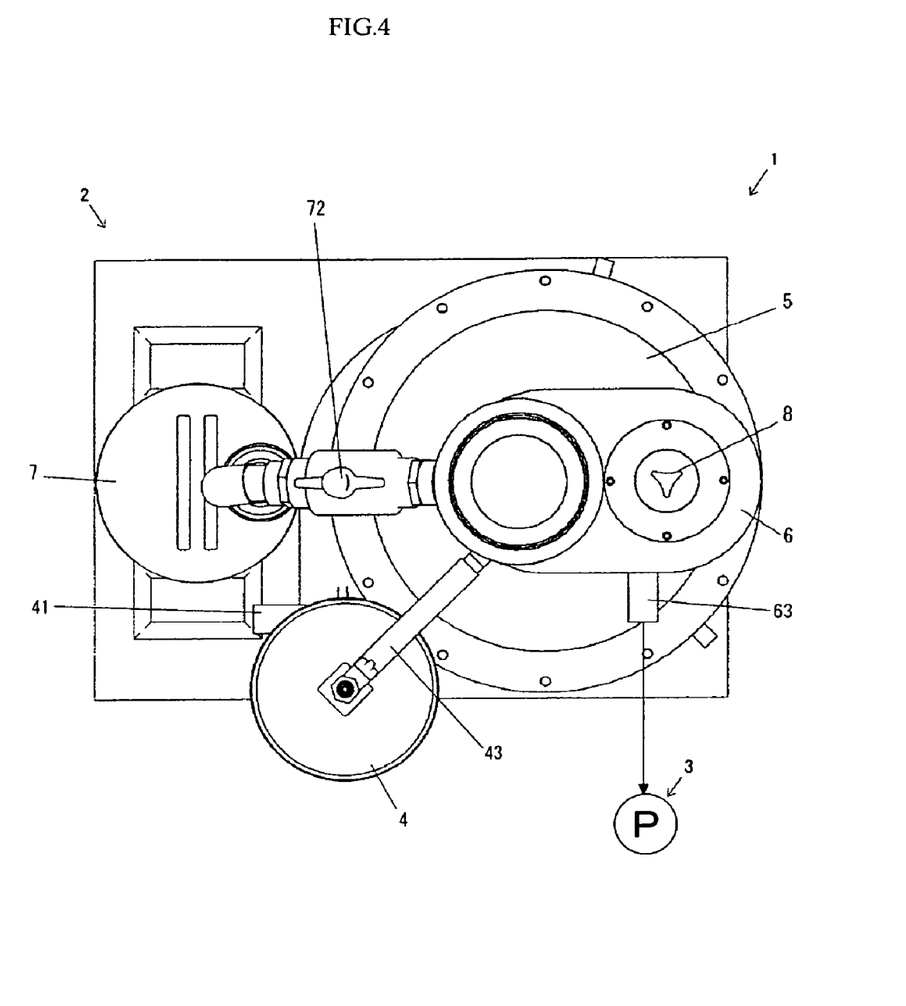
FIG. 4 is a plan view of the same.
Figure 5:
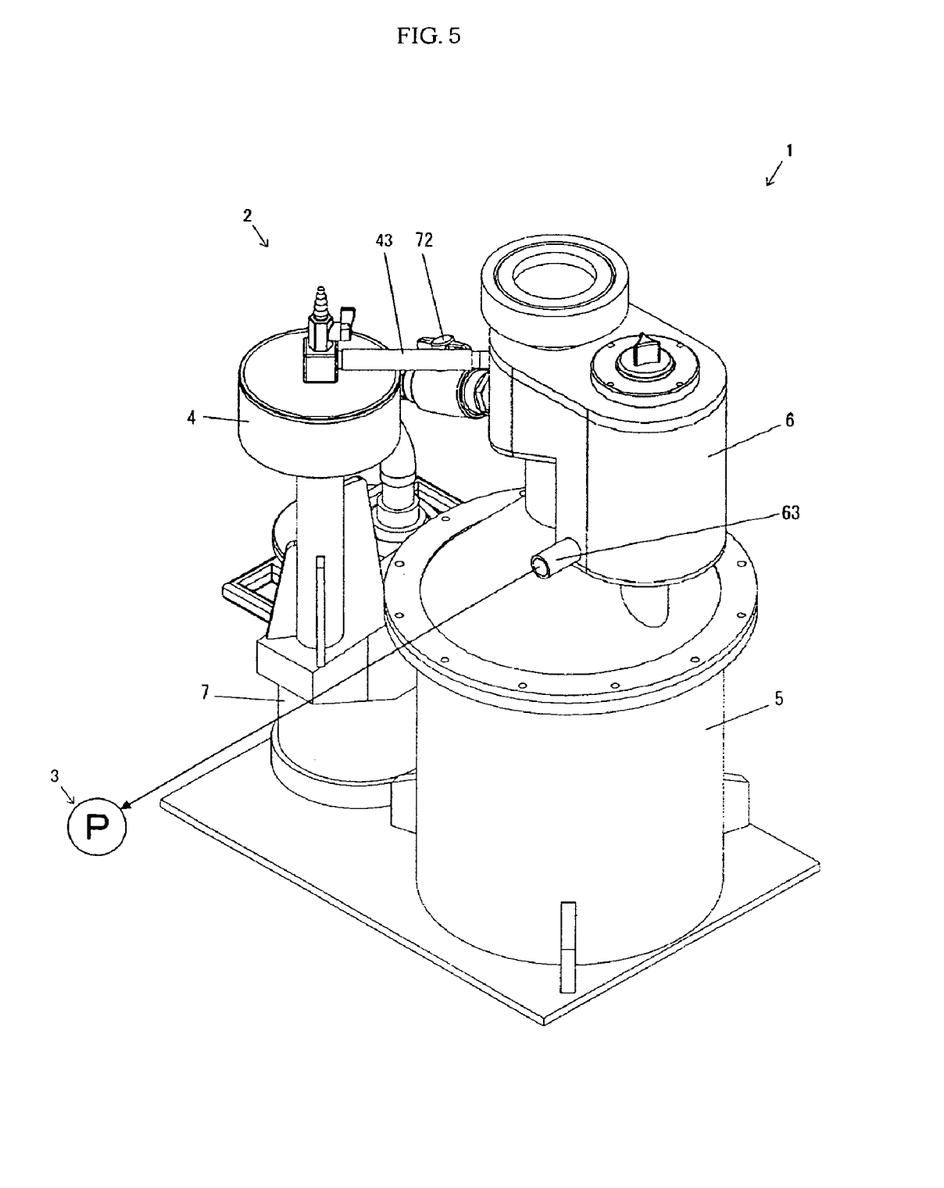
FIG. 5 is a perspective view of the same.

In FIG. 1, arrow signs A to E indicate flows of a mixed liquid of water and oil, oil, water, air, etc., with the arrow sign A indicating the flow of the mixed liquid in which oil is mixed in water (and including air that enters together with the mixed liquid), the arrow sign B indicating the flow of the mixed liquid with which the water and the oil have undergone rough separation, the arrow sign C indicating the flow of the water, the arrow sign D indicating the flow of the oil, and the arrow sign E indicating the flow of air.

An oil-water separator with self-priming pump (may hereinafter be referred to simply as the "separator") 1 according to the present invention is mainly arranged from a separator portion 2 that separates the mixed liquid in which oil is mixed in water, and a pump device portion 3 that introduces the mixed liquid into the separator portion 2.

The separator portion 2 includes a rough separation portion 4 introducing the mixed liquid from an exterior of the separator 1 via a pipe 41 into a cyclone cylinder 42 from a tangential direction to generate a swirl flow and performing rough separation of the water and the oil by cyclone separation by the swirl flow, a main separation portion 5 connected to a downstream side of the rough separation portion 4 and performing main separation of the oil and the water according to specific gravity difference by passing the mixed liquid, which has undergone the rough separation in the rough separation portion 4, from above to below through a liquid passage 51 formed in a multiple-step form, a water discharge portion 6 connected to a lower portion of the multiple-step liquid passage 51 of the main separation portion 5 and discharging the water from which oil has been separated and removed at the main separation portion 5 through a water discharge passage 61 extending from the lower portion of the multiple-step liquid passage 51 to an upper portion of the separator portion 2, and an oil storage tank 7 storing the oil separated from the water at the main separation portion 5 and overflowing from an upper portion of the main separation portion 5.

The pump device portion 3 includes a liquid pump, preferably a self-priming liquid pump (omitted from illustration) connected to a downstream side of the separator portion 2 and connected directly or indirectly to the water discharge portion 6 (connected to a water discharge exit 63 in the present embodiment) to introduce the mixed liquid into the separator portion 2 by sucking the mixed liquid from the exterior of the separator portion 2 via the rough separation portion 4, the main separation portion 5, and the water discharge portion 6. The self-priming liquid pump adopted in the pump device portion 3 suffices to be a known and publicly used liquid pump with a self-priming arrangement and any type having a liquid feeding performance that is in accordance with a processing amount of the oil-water separation can be used without special restriction. The same applies to the liquid pump.

By the arrangement in which the pump device portion 3 having the self-priming liquid pump is disposed at the downstream side of the separator portion 2, the introduction of the mixed liquid into (the separator portion 2 of) the oil-water separator 1 with self-priming pump is performed not by feeding by a pump from an upstream side but by suction from the downstream side by the self-priming liquid pump, and the mixed liquid can thus be introduced into (the separator portion 2 of) the oil-water separator 1 with self-priming pump without the water and the oil in the mixed liquid emulsifying. Whereas in liquid feeding by a liquid feeding pump disposed at an upstream side, the mixed liquid is sucked and fed into the liquid feeding pump in a state where the water and the oil are mixed and the mixed liquid is thus put in a stirred state inside the liquid feeding pump and the water and the oil become stirringly mixed and emulsified, with the arrangement of the present invention, the pump is the self-priming pump disposed at the downstream side, and thus the oil and the water are introduced into (the separator portion 2 of) the oil-water separator 1 and separated before being introduced into the self-priming pump and emulsification does not occur because only the water that has been separated from and removed of the oil is introduced by suction into the self-priming pump. Lowering of separation ability due to emulsification thus does not occur.

Also, an upper portion of the rough separation portion 4, a portion above the main separation portion 5, and an upper portion of the water discharge portion 6 are put in communication in a manner enabling venting, and the air that entered into the separator 2 along with the mixed liquid is thereby sucked and discharged by the self-priming liquid pump of the pump device portion 3. As the arrangement for communication in a manner enabling venting, the upper portion of the rough separation portion 4 and the upper portion of the main separation portion 5 are put in communication via a communicating pipe 43, and the upper portion of the main separation portion 5 and the upper portion of the water discharge portion 6 are put in communication via a communicating hole 62 bored in partition wall portions of the two component portions. An inner diameter of the communicating pipe 43 and a diameter of the communicating hole 62 are preferably 1 to 10 mm and more preferably 4 to 5 mm. In a case where the diameters are less than 1 mm, an exhaust efficiency is poor, and in a case where the diameters exceed 10 mm, cyclone separation efficiency of the rough separation portion 4 decreases.

By the communicating pipe 43 and the communicating hole 62, the air that entered into the separator portion 2 along with the mixed liquid is exhausted through the upper portions of the rough separation portion 4, the main separation portion 5, and the water discharge portion 6 and is thereby prevented from making the mixed liquid turbid inside the separator portion 2 (especially inside the cyclone cylinder 42 of the rough separation portion 4). The oil-water separation efficiency is thus not lowered and the water and the oil can be separated extremely efficiently and rapidly.

In the figures, the symbol 44 indicates an air valve portion for releasing a negative pressure inside the separator portion 2 (especially the rough separation portion 4) during cleaning or draining.

The respective component portions and the oil-water separation arrangement shall now be described in further detail.

With the mixed liquid introduced into the rough separation portion 4, a difference in inflow velocity due to a difference of specific gravity causes the water, which is high in specific gravity, to move toward an outer side of the cyclone cylinder 42 by swirling and the oil, which is low in specific gravity, to concentrate at a central portion of the cyclone cylinder 42 by swirling. The air that entered together with the mixed liquid escapes upward, passes through the upper portion of the main separation portion 5 through the communicating pipe 43, moves to the upper portion of the water draining portion 6 through the communicating hole 62, and is thereafter discharged out of the separator portion 2 by being sucked by the self-priming liquid pump of the pump device portion 3.

The mixed liquid that has undergone the rough separation of the water and the oil in the rough separation portion 4 subsequently moves into the main separation portion 5 where the oil that is low in specific gravity floats and the water that is high in specific gravity moves from above to below through the multiple-step liquid passage 51. If air is still contained in the mixed liquid at this point, the air floats from inside the mixed liquid and escapes to an upper side of the main separation portion 5, and after moving to the upper portion of the water discharge portion 6 from the communicating hole 62, is discharged out of the separator portion 2 by being sucked by the self-priming liquid pump of the pump device portion 3.

The oil separated and floated from the water in the main separation portion 5 overflows from an overflow portion 52 at the upper portion of the main separation portion 5 and is stored in the oil storage tank 7 via an oil passage pipe 71 connected to the oil storage tank 7.

The oil storage tank 7 is detachably connected to the oil passage pipe 71, and an opening/closing valve 72 for enabling a negative pressure state to be maintained inside the separator portion 2 during attachment and detachment of the oil storage tank 7 is disposed in a pathway of the oil passage pipe 71. The oil stored in an interior of the oil storage tank 7 can be discarded by removing the oil passage pipe 71 or the oil storage tank 7 upon closing the opening/closing valve 72 at a point at which an amount of the oil stored in the oil storage tank 7 reaches a suitable amount (for example, at a point at which a full amount is reached or at a point at which a suitable separation process has ended).

Figure 6:
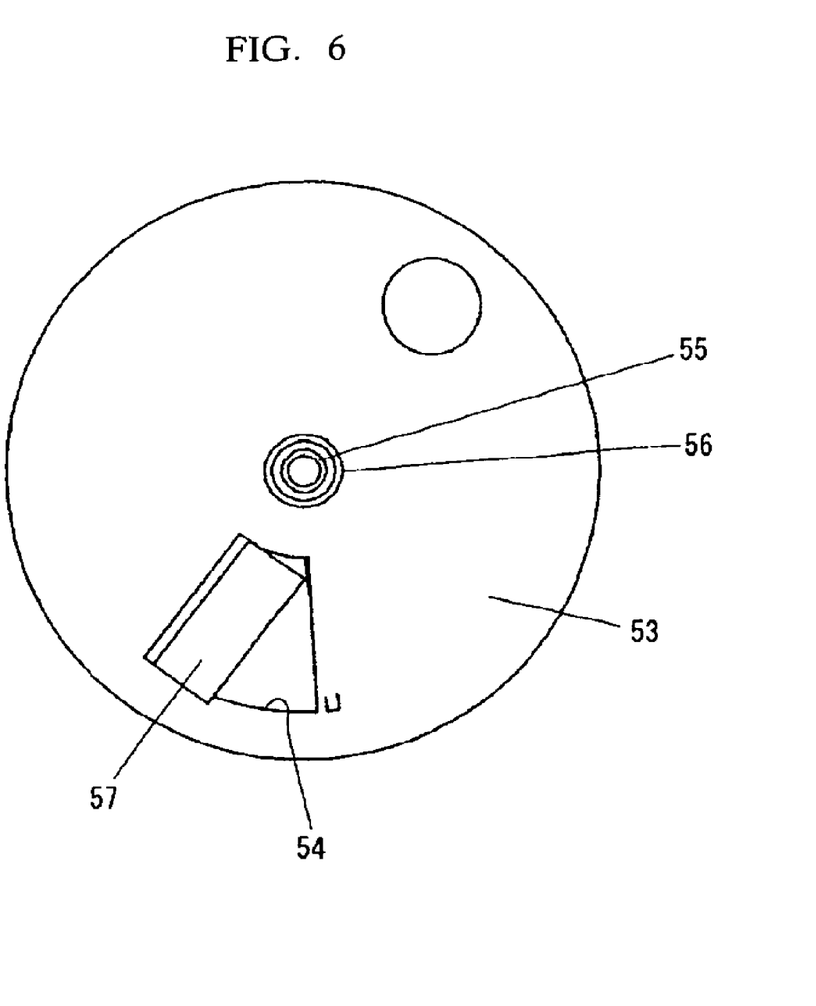
FIG. 6 is a plan view of an example of an umbrella-shaped member, a liquid passing hole, and a baffle plate that make up a multiple-step liquid passage.
Figure 7:
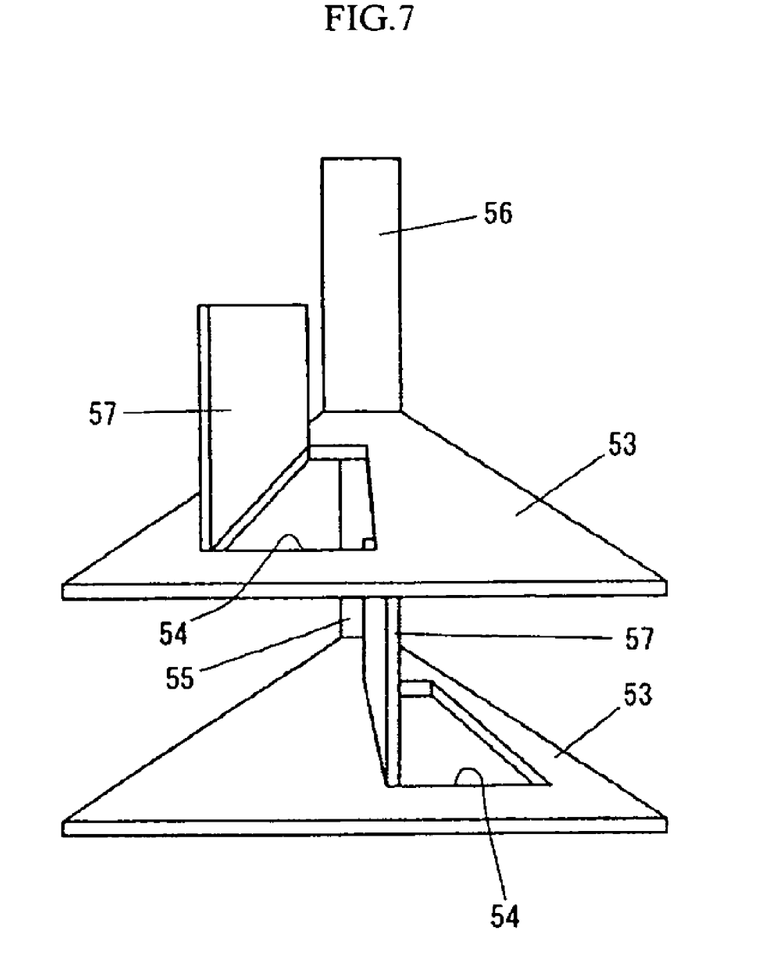
FIG. 7 is a left side view of the same.

The multiple-step liquid passage 51 of the main separation portion 5 is formed by disposing conical, umbrella-shaped members 53 in multiple steps as shown in FIG. 1, FIG. 6, and FIG. 7, a liquid passing hole 54 connecting the respective steps in a manner enabling passage of liquid is formed in a portion of a slope of each umbrella-shaped member 53, floating separation passage pipes 55 and 56, which let the oil that separated from the water at lower sides of the respective umbrella-shaped members 53 float to an upper side of the main separation portion 5, are connected to apex portions of the respective umbrella-shaped members 53, and as the mixed liquid moves to a lower step through the liquid passing hole of each umbrella-shaped member of the multiple-step liquid passage 51, the oil in the mixed liquid floats upward due to being low in specific gravity, the water flows downward, and the water and the oil can be separated by the specific gravity difference.

Preferably, a baffle plate 57, which resists flow of passing liquid, is disposed at an upper portion, at a downstream side in a liquid passing direction of the liquid passing hole 54, of each umbrella-shaped member 53. By disposing the baffle plates 57, the mixed liquid collides with the baffle plates 57 as the mixed liquid passes through the multiple-step liquid passage 51, causing the oil in the mixed liquid to separate from the water and float upward due to the lowness of specific gravity and the water and the oil are thereby separated.

As described above, with the mixed liquid, first, the water and the oil undergo rough separation at the rough separation portion 4, and by then being fed into the main separation portion 5, a large portion of the separated oil floats, overflows from the overflow portion 52, and is fed into the oil storage tank 7 via the oil passage pipe 71. The oil that is still mixed in the mixed liquid at the point of being fed into the main separation portion 5 separates gradually by passing from above to below the multiple-step liquid passage 51 of the main separation portion 5 and substantially all of the oil is thereby separated from the water and floats by the time a lowermost portion of the multiple-step liquid passage 51 is reached.

The oil separated at each step of the multiple-step liquid passage 51 floats upward through the liquid passing hole 54 formed in the umbrella-shaped member 53 or moves along a lower surface of the umbrella-shaped member 53 to a central portion of the umbrella-shaped member 53 and floats upward through the floating separation passage pipe 55 or 56 connected to the apex portion of the umbrella-shaped member 53, then overflows from the overflow portion 52, and is fed into the oil storage tank 7.

The remaining water, which has been separated from and removed of the oil in the mixed liquid by passing through the rough separation portion 4 and passing through the main separation portion 5 as described above, passes through the water discharge passage 61 of the water discharge portion 6, thereafter passes through the pump device portion 3 from the water discharge exit 63, and is thereafter fed into a subsequent process of the oil-water separator 1 with self-priming pump or is discharged to the exterior.

In the present embodiment, a liquid level inside the separator portion 2 can be adjusted by vertically moving a liquid level adjustment portion 8 disposed at an upper portion of the water discharge portion 6. As a vertical movement arrangement for the liquid level adjusting portion 8, the liquid level adjusting portion 8 can be moved vertically via a magnet coupling portion 81 by turning an adjustment handle 82 attached to an upper portion of the separator portion 2.

By the invention according to the first aspect, an oil-water separator with self-priming pump of high oil-water separation ability that enables a mixed liquid to be introduced into the oil-water separator without causing emulsification of water and oil in the mixed liquid can be provided.

In particular, the mixed liquid can be introduced into the oil-water separator without the water and the oil in the mixed liquid emulsifying because the introduction into the oil-water separator is performed by suction by the self-priming pump disposed at the downstream side of the separator portion of the oil-water separator. That is, whereas in the conventional liquid feeding by a liquid feeding pump disposed at an upstream side, the mixed liquid is sucked and fed into the liquid feeding pump in a state where the water and the oil are mixed and the mixed liquid is thus put in a stirred state inside the liquid feeding pump and the water and the oil become stirringly mixed and emulsified, with the invention according to the first aspect, the pump is the self-priming pump disposed at the downstream side, and thus the oil and the water are introduced into the oil-water separator and separated before being introduced into the self-priming pump and emulsification does not occur because the water that has been separated from and removed of the oil is introduced by suction into the self-priming pump. Lowering of the separation ability due to emulsification thus does not occur.

Further, the air that entered into the separator portion along with the mixed liquid is exhausted through the upper portions of the rough separation portion, the main separation portion, and the water discharge portion and is thereby prevented from making the mixed liquid turbid inside the separator portion (especially inside the cyclone cylinder of the rough separation portion). The oil-water separation efficiency is thus not lowered and the water and the oil can be separated extremely efficiently and rapidly.

By the invention according to the second aspect, the oil separated from the mixed liquid can be introduced rapidly and reliably into the oil storage tank.

By the invention according to the third aspect, the oil stored in the oil storage tank can be discarded while maintaining the negative pressure state inside the separator portion.

By the invention according to the fourth aspect, as the mixed liquid moves to a lower step through the liquid passing hole of each umbrella-shaped member of the multiple-step liquid passage, the oil in the mixed liquid floats upward due to being low in specific gravity, the water flows downward, and the water and the oil can be separated by the specific gravity difference.

By the invention according to the fifth aspect, the mixed liquid collides with the baffle plates of the umbrella-shaped member as the mixed liquid passes through the multiple-step liquid passage, causing the oil in the mixed liquid to separate from the water and float upward due to the lowness of specific gravity and the water and the oil can thereby be separated.

By the invention according to the sixth aspect, the air that entered into the separator portion along with the mixed liquid is exhausted efficiently through the upper portions of the rough separation portion, the main separation portion, and the water discharge portion. In a case where the diameters are less than 1 mm, the exhaust efficiency is poor, and in a case where the diameters exceeds 10 mm, the cyclone separation efficiency of the rough separation portion decreases.

By the invention according to the seventh aspect, the air that entered into the separator portion along with the mixed liquid is exhausted extremely efficiently through the upper portions of the rough separation portion, the main separation portion, and the water discharge portion.

What is claimed is:

1. An oil-water separator with self-priming pump including a separator portion separating a mixed liquid in which oil is mixed in water, and a pump device portion introducing the mixed liquid into the separator portion,
the oil-water separator with self-priming pump having an arrangement where the separator portion includes a rough separation portion performing rough separation of the oil and the water by cyclone separation in which a swirl flow is generated by introduction of the mixed liquid into a cyclone cylinder,
a main separation portion connected to a downstream side of the rough separation portion and performing main separation of the oil and the water according to specific gravity difference by passing the mixed liquid, which has undergone the rough separation in the rough separation portion, from above to below through a liquid passage formed in multiple-step form,
a water discharge portion connected to a lower portion of the multiple-step liquid passage of the main separation portion and discharging the water from which oil has been separated and removed at the main separation portion through a water discharge passage extending from the lower portion of the multiple-step liquid passage to an upper portion of the separator portion, and
an oil storage tank storing the oil separated from the water at the main separation portion and overflowing from an upper portion of the main separation portion,
the pump device portion
includes a self-priming liquid pump connected to a downstream side of the separator portion and connected directly or indirectly to the water discharge portion to introduce the mixed liquid into the separator portion by sucking the mixed liquid from an exterior of the separator portion via the rough separation portion, the main separation portion, and the water discharge portion, and
by an upper portion of the rough separation portion and a portion above the main separation portion being communicatively connected by a communicating pipe, having one end connected to a portion of the rough separation portion positioned above the cyclone cylinder and having another end connected to a main body of the separator at a position above an overflow portion, which is an uppermost end portion of the main separation portion, and an upper portion of the main body of the separator, which is a portion above the overflow portion, and a portion above a liquid level of the water discharge portion and adjacent the portion above the overflow portion being communicatively connected by a communicating hole, a portion above a liquid level of the rough separation portion, a portion above the overflow portion that is a liquid level position of the main separation portion, and a portion above the liquid level of the water discharge portion are put in communication in a manner enabling air to be vented in that order and air, which has entered inside the separator, is thereby sucked and discharged by the self-priming pump.

2. The oil-water separator with self-priming pump according to claim 1 above where the oil separated from the water at the main separation portion and overflowing from the upper portion of the main separation portion is introduced into the oil storage tank via an oil passage pipe connected to the oil storage tank.

3. The oil-water separator with self-priming pump according to claim 2 above where the oil storage tank is detachably connected to the oil passage pipe, and an opening/closing valve for enabling a negative pressure state to be maintained inside the separator portion during attachment and detachment of an oil passage pipe is disposed in the oil passage pipe.

4. The oil-water separator with self-priming pump according to claim 1 above where
the multiple-step liquid passage is formed by disposing conical, umbrella-shaped members in multiple steps, a liquid passing hole connecting the respective steps in a manner enabling passage of liquid is formed in a portion of a slope of each umbrella-shaped member, and a floating separation passage pipe, which lets the oil that separated from the water at a lower side of each umbrella-shaped member float to an upper side of the main separation portion, is connected to an apex portion of each umbrella-shaped member.

5. The oil-water separator with self-priming pump according to claim 4 above where a baffle plate, which resists flow of passing liquid, is disposed at an upper portion, at a downstream side in a liquid passing direction of the liquid passing hole, of each umbrella-shaped member.

6. The oil-water separator with self-priming pump according to claim 1 above where diameters of venting holes putting in communication the upper portion of the rough separation portion, the portion above the main separation portion, and the upper portion of the water discharge portion in the manner enabling venting of air are 1 to 10 mm.

7. The oil-water separator with self-priming pump according to claim 1 above where diameters of venting holes putting in communication the upper portion of the rough separation portion, the portion above the main separation portion, and the upper portion of the water discharge portion in the manner enabling venting of air are 4 to 5 mm.

\* \* \* \* \*